(12) United States Patent
Petitt

(10) Patent No.: US 10,624,501 B2
(45) Date of Patent: Apr. 21, 2020

(54) SELF-CONTAINED BEVERAGE UNIT FOR TRANSPORTING AND CREATING A MIXED BEVERAGE

(71) Applicant: Brian Petitt, Palm City, FL (US)

(72) Inventor: Brian Petitt, Palm City, FL (US)

(*) Notice: Subject to any disclaimer, the term of this patent is extended or adjusted under 35 U.S.C. 154(b) by 7 days.

(21) Appl. No.: 15/908,095

(22) Filed: Feb. 28, 2018

(65) Prior Publication Data

US 2018/0249865 A1 Sep. 6, 2018

Related U.S. Application Data

(60) Provisional application No. 62/466,717, filed on Mar. 3, 2017, provisional application No. 62/467,588, filed on Mar. 6, 2017.

(51) Int. Cl.

| A47G 19/23 | (2006.01) |
|---|---|
| B65D 21/032 | (2006.01) |
| A47J 43/27 | (2006.01) |
| A47G 19/22 | (2006.01) |
| A47G 23/02 | (2006.01) |
| B65D 81/32 | (2006.01) |
| B65D 51/28 | (2006.01) |
| B65D 21/02 | (2006.01) |
| A47G 19/12 | (2006.01) |

(52) U.S. Cl.
CPC .......... *A47J 43/27* (2013.01); *A47G 19/2211* (2013.01); *A47G 19/2272* (2013.01); *A47G 23/0233* (2013.01); *B65D 51/2807* (2013.01); *B65D 81/32* (2013.01); *B65D 81/3205* (2013.01); *B65D 81/3283* (2013.01); *A47G 23/0266* (2013.01); *A47G 2019/122* (2013.01)

(58) Field of Classification Search
CPC ..... A47J 43/27; B65D 81/32; B65D 51/2807; B65D 81/3205; B65D 81/3283; A47G 19/2211; A47G 19/2272; A47G 23/0233; A47G 23/0266; A47G 2019/122
USPC ............... 220/703, 4.27, 23.87, 23.83, 23.86
See application file for complete search history.

(56) References Cited

U.S. PATENT DOCUMENTS

| 4,348,421 A * | 9/1982 | Sakakibara | A47J 47/14 206/217 |
|---|---|---|---|
| 5,419,429 A * | 5/1995 | Zimmerman | A47J 43/27 206/222 |
| 6,706,297 B1 * | 3/2004 | Toth | A47G 19/065 206/223 |

(Continued)

*Primary Examiner* — J. Gregory Pickett
*Assistant Examiner* — Niki M Eloshway
(74) *Attorney, Agent, or Firm* — McHale & Slavin, P.A.

(57) ABSTRACT

A self-contained unit that stores, or contains, one or more ingredients required for a mixed drink. The self-contained unit allows for storing fluids and has multiple parts for storing individual components or ingredients associated with a mixed drink, which, when mixed together, provide a predetermined, blended liquid beverage. The self-contained unit comprises at least three components which can be packaged as a single, individual unit. The self-contained unit includes an upper portion, an intermediate portion, and a lower portion. The self-contained unit is configured to 1) contain all necessary ingredients to provide a mixed drink, 2) provide an easy to handle, all-in-one transportation mechanism, and 3) provide a device to allow a user to store and drink the mixed drink therefrom.

17 Claims, 9 Drawing Sheets

(56) References Cited

U.S. PATENT DOCUMENTS

| | | | | |
|---|---|---|---|---|
| 7,882,975 B2* | 2/2011 | Kelly | A47J 41/0077 | |
| | | | | 220/23.83 |
| 8,596,491 B2* | 12/2013 | Buck | A47G 19/2205 | |
| | | | | 206/815 |
| 8,973,776 B1* | 3/2015 | Buck | A47G 19/2272 | |
| | | | | 220/521 |
| 9,078,535 B1* | 7/2015 | Buck | A47G 19/2205 | |
| 2005/0098561 A1* | 5/2005 | Schwoebel | B65D 17/4012 | |
| | | | | 220/258.1 |
| 2008/0078200 A1* | 4/2008 | Roth | A47J 36/2416 | |
| | | | | 62/457.4 |
| 2013/0341443 A1* | 12/2013 | Stephenson | B65D 11/02 | |
| | | | | 241/38 |
| 2014/0144910 A1* | 5/2014 | Ueda | A47G 19/065 | |
| | | | | 220/23.87 |
| 2015/0114994 A1* | 4/2015 | Matteri | A47J 43/27 | |
| | | | | 366/130 |
| 2016/0166115 A1* | 6/2016 | Schlesinger | A47J 43/27 | |
| | | | | 220/568 |
| 2018/0029752 A1* | 2/2018 | Clark | B65D 25/04 | |
| 2018/0326435 A1* | 11/2018 | Camilleri | B05B 7/02 | |

\* cited by examiner

SELF-CONTAINED BEVERAGE UNIT FOR TRANSPORTING AND CREATING A MIXED BEVERAGE

CROSS REFERENCE

In accordance with 37 C.F.R. 1.76, a claim of priority is included in an Application Data Sheet filed concurrently herewith. Accordingly, the present invention claims priority to U.S. Provisional Application No. 62/466,717, entitled, "SELF-CONTAINED BEVERAGE UNIT FOR TRANSPORTING AND CREATING A MIXED BEVERAGE", filed Mar. 3, 2017, and U.S. Provisional Application No. 62/467,588, entitled, "SELF-CONTAINED BEVERAGE UNIT FOR TRANSPORTING AND CREATING A MIXED BEVERAGE", filed Mar. 6, 2017. The contents of the above referenced applications are incorporated herein by reference in their entirety.

FIELD OF THE INVENTION

The present invention relates to a container for storing fluids and, more particularly, to an individually sealed beverage container having multiple compartments for storing individual components of a drink, which, when mixed together, provide a predetermined, blended liquid concoction.

BACKGROUND OF THE INVENTION

The beverage industry, including alcoholic and non-alcoholic beverages, is a multi-billion dollar industry. While many of these beverages are consumed at restaurants, bars, or commercial events such as sporting events or concerts, beverages can be enjoyed anywhere and at any location. Often, mixed drink beverages are enjoyed at special events away from home. To provide variety, consumers often need to provide many different components to create various mixed drinks. For example, mixed drinks require different types of alcohols, different types of flavorings, or different types of mixers. For those celebrating outside of their home, such as at a beach, club house, boating, tailgating, pool parties, picnics or camping, supplying multiple bottles of liquor, flavoring, and mixers would be required to provide their guests with multiple drink options.

Providing individual drink units containing the necessary components to form a predetermined liquid concoction would simplify the preparation of cocktails. A single individual drink unit reduces the need to provide all the different components for creating a drink. In addition to reducing the amount of supplies required and the costs involved, an individual drink unit makes it very easy to prepare a particular cocktail with limited knowledge of what makes a particular drink. Finally, individual drink units in accordance with the present invention will provide a cocktail which is mixed and prepared using precise, pre-measured portions to ensure perfectly mixed cocktails each time.

SUMMARY OF THE INVENTION

The present invention is directed towards a container for storing fluids having multiple compartments for storing individual components of a mixed drink, which, when mixed together, provide a predetermined, blended liquid concoction. The mixed drink container for storing fluids is configured to contain all of the necessary ingredients to provide a mixed drink, and to provide an easy to handle, all-in-one transportation mechanism. In one embodiment, the mixed drink container comprises at least three components which can be packaged as a single, individual unit. The mixed drink container includes an upper portion, an intermediate portion, and a lower portion.

Accordingly, it is an objective of the invention to provide a container for storing fluids.

It is also an objective of the invention to provide a container for storing fluids separated in individual compartments.

It is a further objective of the invention to provide an individually sealed beverage container for storing fluids.

It is yet another objective of the invention to provide a beverage container comprising a plurality of individual compartments for storing one or more components of a mixed drink.

It is a still further objective of the invention to provide a beverage container comprising a plurality of individual compartments for storing one or more components of a mixed drink and a first cocktail mixer holding portion.

It is a further objective of the invention to provide a beverage container comprising a plurality of individual compartments for storing one or more components of a mixed drink, a first cocktail mixer holding portion, and a mixing receptacle.

It is yet another objective of the invention to provide a container for storing all components of a mixed drink, which, when mixed together, provide a predetermined, blended liquid concoction.

It is a further objective of the invention to provide a container unit having several components configured for preparing and consuming a mixed drink.

It is yet another objective of the invention to provide a container unit configured to contain all of the necessary ingredients to provide a mixed drink.

It is a still further objective of the invention to provide a container unit configured to provide an easy to handle, all-in-one transportation mechanism.

It is a still further objective of the invention to provide a container unit configured to provide a device to allow a user to store and drink a mixed drink therefrom.

It is yet another objective of the invention to provide a self-contained unit that contains all of the ingredients required for a mixed drink, including a drinking cup to consume the mixed drink, in a simple and easy to use package.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
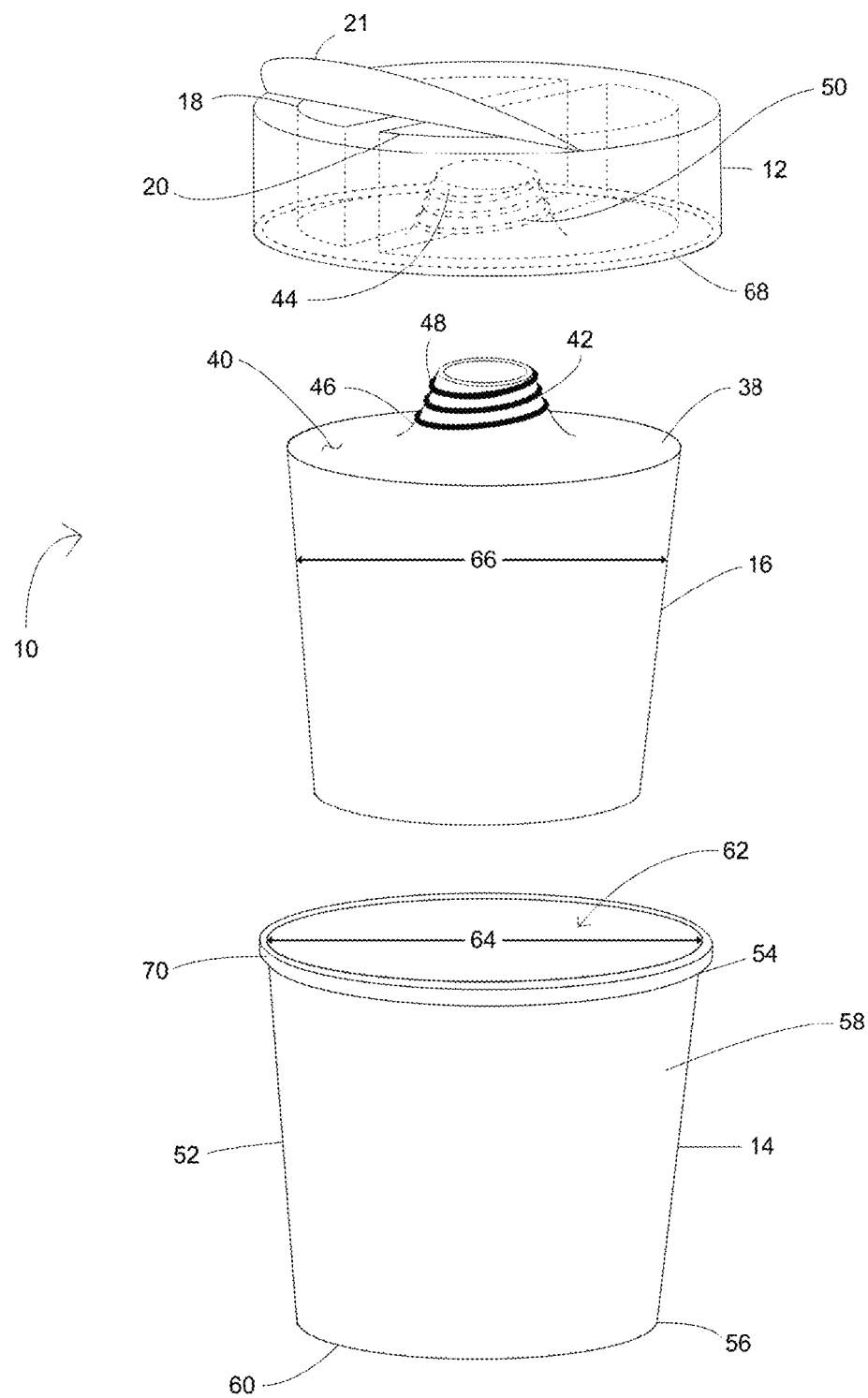
FIG. 1 is an exploded view of an illustrative example of a drink container.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
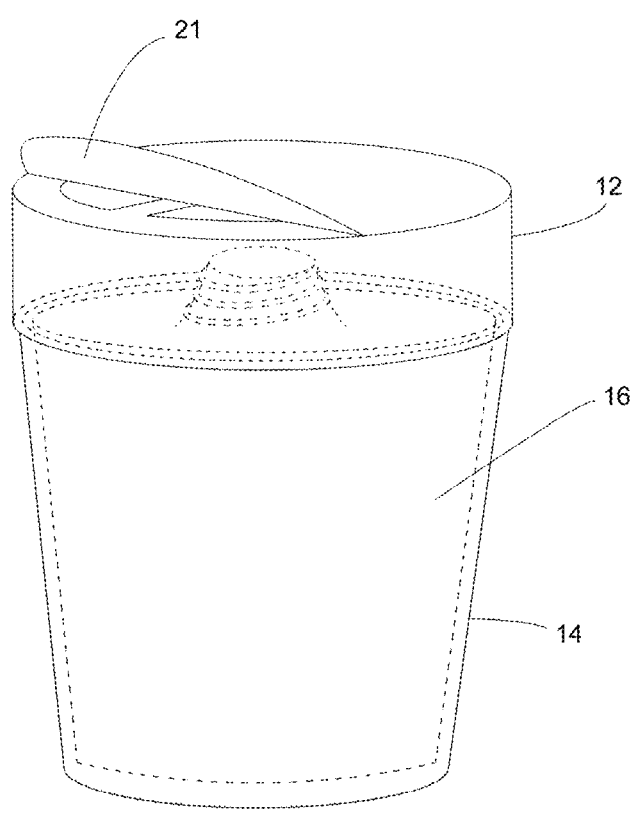
FIG. 2 is a perspective view of the drink container illustrated in FIG. 1.

Referring to FIGS. 1 and 2, a self-contained container, referred to generally as drink container 10, for storing fluids having multiple compartments for storing individual components of a mixed drink, which, when mixed together, provide a predetermined, blended liquid concoction, is illustrated. The self-contained unit, therefore, contains all of the ingredients required for a mixed drink, including a drinking cup to consume the mixed drink, in a simple and easy to use package. The drink container 10 comprises at least three components which can be packaged as a single, individual unit. A first upper portion 12, illustrated herein as a lid, a bottom portion 14, illustrated herein as a drinking receptacle, and an intermediate portion 16, illustrated herein as a liquid storage receptacle. The drink container 10 is configured to 1) contain all of the necessary ingredients to provide a mixed drink, 2) provide an easy to handle, all-in-one transportation mechanism, and 3) provide a device to allow a user to store and drink the mixed drink therefrom. As used herein, the term "mixed drink" refers to an alcoholic or non-alcoholic liquid which contains two or more ingredients which, when mixed together, form a flavored beverage or drink.

The first upper portion lid 12 is configured to secure to both the bottom drinking receptacle portion 14 and the intermediate mixed liquid storage receptacle portion 16. FIG. 2 illustrates the drink container 10 with the upper portion lid secured to the bottom drinking receptacle portion 14. The intermediate mixed liquid storage receptacle portion 16, shown in dashed lines, secures to the upper portion lid 12 while positioned within the bottom drinking receptacle portion 14.

The upper portion lid 12 may contain one or more partially enclosed compartments 18 and 20 sized and shaped to receive and hold one or more components or ingredients needed for making a mixed drink. As an illustrative example, a mixed drink may be a gin and tonic. In this case, compartment 18 may contain the alcoholic component, gin, required for making this mixed drink. Since many drinkers of a gin and tonic may also want to add additional flavor to the mixed drink, partially enclosed compartment 20 may contain flavoring, such as lime juice. Additionally, partially enclosed compartment 18 or 20 may contain non-fluid components of a drink, such as cherries, sliced limes, basil, or mint leaves. While lid 12 is shown with two partially enclosed compartments, 18 and 20, a single compartment or more than two compartments may be used.

Figure 5:
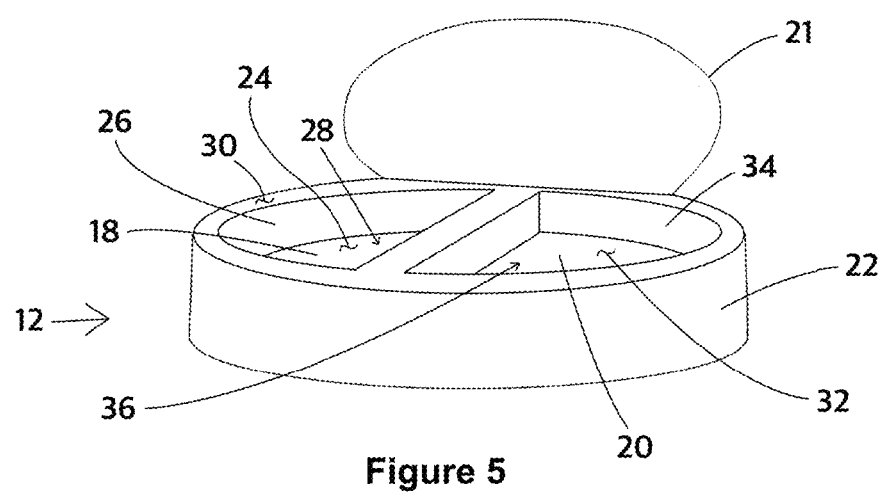
FIG. 5 illustrates an example of an upper portion of the drink container, illustrating a multiple compartment feature for individually storing multiple ingredients associated with a particular mixed drink.

As illustrated in FIG. 5, compartment 18, which may be carved into or integrally formed from the body 22 of the lid 12, comprises a bottom surface 24 and a surrounding wall 26. Opening 28 is cut out from the upper surface 30 of the lid 12, thereby forming the partially enclosed structure. Compartment 20 may also be carved into or integrally formed from the body 22 of the lid 12. Compartment 20 comprises a bottom surface 32 surrounded by wall 34. Opening 36 is cut out from the upper surface 30 of the lid 12, thereby forming the second partially enclosed structure. To prevent spillage and to maintain cleanliness and flavor, compartments 18 and 20 may be fully enclosed with the use of a cover 21, illustrated herein as a peel top plastic material. Cover 21 may be secured to portions of the lid by using chemical fastening, such as glue, through heat sealing, or any other fastening mechanisms known to one of skill in the art. Alternatively, cover 21 may be a foil or may be a plastic twist off.

The intermediate mixed liquid storage receptacle portion 16 contains a main body 38 sized and shaped to receive and store a mixing liquid for use in making a mixed drink. Typically, the mixing liquid is not an alcoholic liquid, but rather some liquid, preferably flavored or carbonated, that mixes with the alcoholic liquid and provides the mixed drink a particular flavor or taste. In the example described above for the gin and tonic, the intermediate mixed liquid storage receptacle portion main body 38 would store tonic water therein. For other mixed drinks that require carbonated soda liquids, the intermediate mixed liquid storage receptacle portion main body 38 might contain COKE or PEPSI. While tonic water or carbonated soda beverages have been described, the intermediate mixed liquid storage receptacle portion main body 38 may contain any flavored or non-flavored liquid.

An upper surface 40 of the intermediate mixed liquid storage receptacle portion main body 38 may contain a first member of an upper portion to intermediate portion securing lock configured to receive or secure to a second member of an upper portion to intermediate portion securing lock 44 located within the upper portion lid 12. The first member of an upper portion to intermediate portion securing lock 42 is illustrated as a body 46 that extends upwardly and away from the intermediate portion upper surface 40. The first member of an upper portion to intermediate portion securing lock 42 contains threading 48 (male threading) configured to engage and secure with corresponding threading 50 (female threading) associated with the second member of the upper portion to intermediate portion securing lock 44. As illustrated in FIG. 1, the second member of the upper portion to intermediate portion securing lock 44 is shown as a recessed portion. The second member of the upper portion to intermediate portion securing lock 44 is sized and shaped to receive and hold the first member of an upper portion to intermediate portion securing lock 42. In use, a user would simply place the first member of an upper portion to intermediate portion securing lock 42 into the second member of the upper portion to intermediate portion securing lock 44. Rotating in a clockwise direction engages threading 48 and threading 50 to lock the two portions in place.

Figure 3:
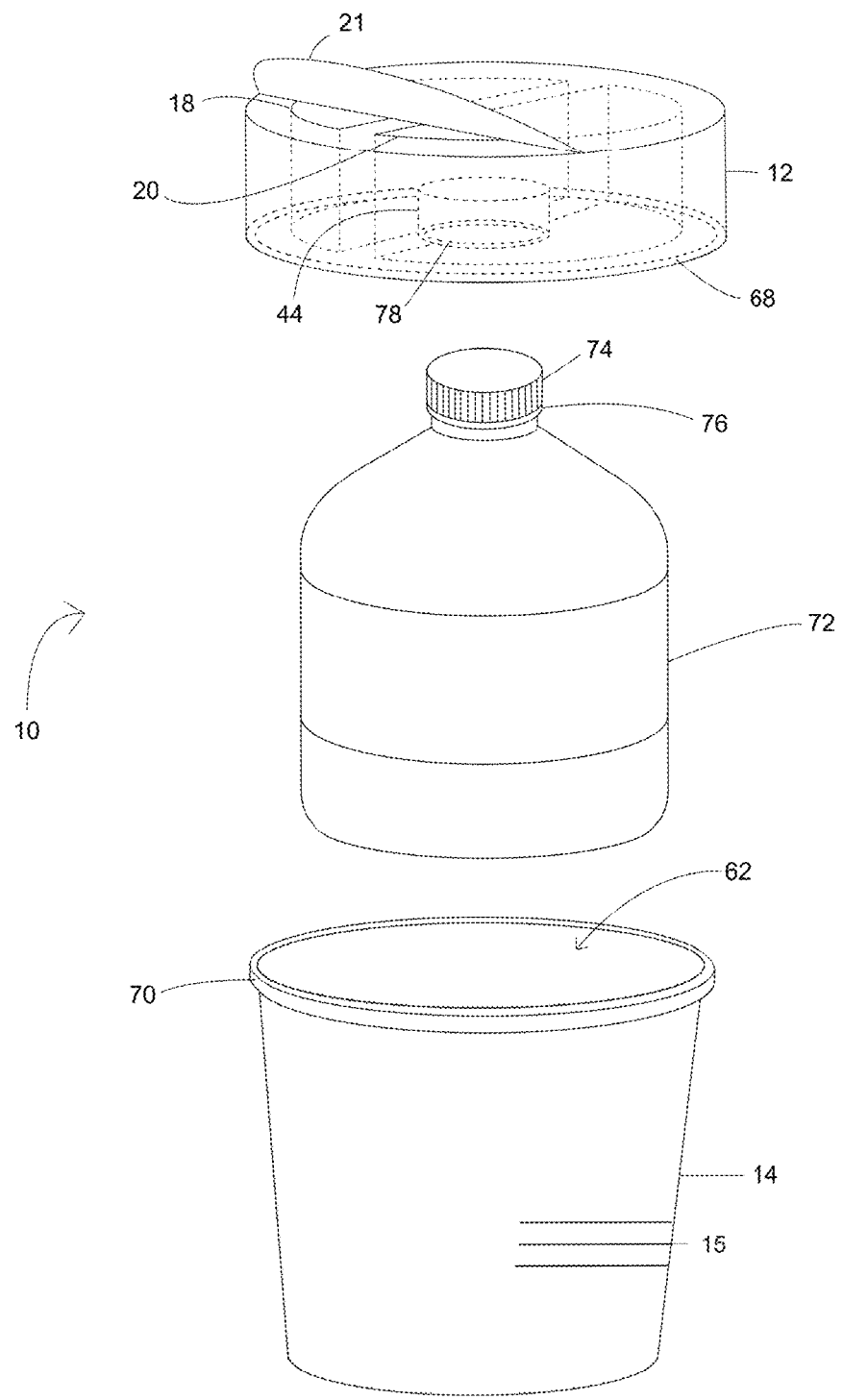
FIG. 3 is an exploded view of the drink container configured to secure an intermediate portion in the form of a plastic bottle.

The bottom drinking receptacle portion 14 comprises a main body 52 having a first end 54 and a second opposing end 56. The bottom drinking receptacle portion main body 52 comprises a continuous wall surrounding a bottom surface 60 to partially enclose an interior region 62. The bottom drinking receptacle portion 14 may contain measuring lines or indicia 15 for measuring alcoholic or other liquids. In FIG. 3, the measuring lines are shown on the outside of the drinking receptacle portion, but may be on the inside surface as well. The bottom drinking receptacle portion 14 is designed to receive the intermediate mixed liquid storage receptacle portion 16 when not being used as a drinking receptacle. As such, the diameter 64 of the main body 52 is larger than the diameter 66 of the intermediate mixed liquid storage receptacle portion main body 38.

The upper portion lid 12, with or without the intermediate mixed liquid storage receptacle portion main body attached thereto, secures to the bottom drinking receptacle portion 14 through frictional fit (snap fit) or other mechanical mechanisms. For example, the upper portion lid 12 may contain a channel or a ridge, notated as dotted line 68, which fits with a ledge or ride (or corresponding channel) 70 of the bottom drinking receptacle portion main body 52. Alternatively, the upper portion lid 12 and the bottom drinking receptacle portion main body 52 may utilize male/female threading (not shown) to secure together. For use as a drinking vessel, an individual simply adds all components, i.e. the gin, the tonic water, lime juice, and ice if desired, into the bottom drinking receptacle portion main body 52. Once mixed, the newly formed mixed drink is ready to go with all the necessary ingredients provided.

Figure 4:
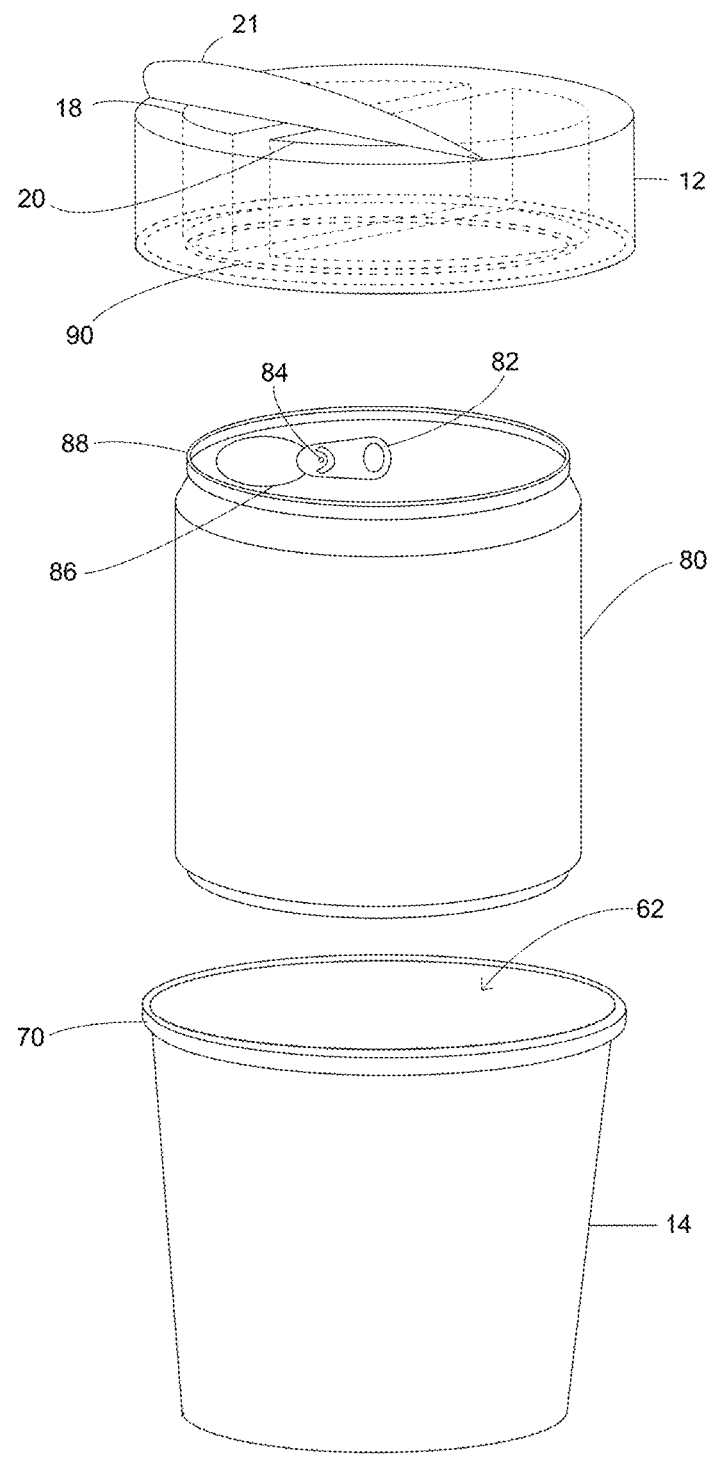
FIG. 4 is an exploded view of the drink container configured to secure an intermediate portion in the form of an aluminum beverage container.

FIGS. 3 and 4 illustrate the drink container 10 having alternative embodiments of the intermediate mixed liquid storage receptacle portion 16. Referring specifically to FIG. 3, the intermediate mixed liquid storage receptacle portion is shown as a plastic bottle 72. The plastic bottle 72 may contain prefilled fluids, such as water, tonic water, flavored carbonated drinks such as COKE or PEPSI, lemonade, or ice tea. A cap 74 or a ridge 76 may be inserted into the second member of the upper portion to intermediate portion securing lock 44 located within the upper portion lid 12. One or more flexible tabs 78 may be used to maintain the plastic bottle in place.

FIG. 4 illustrates the intermediate mixed liquid storage receptacle portion as a can 80, such as an aluminum/tin beverage can. The can 80 may contain prefilled fluids, such as water, tonic water, flavored carbonated drinks such as COKE or PEPSI, lemonade, or ice tea. A pull tab or stay-tab 82 having a lever 84 with a pre-scored round tab 86 may be used to maintain the can in a closed position, thereby preventing the contents therein from spilling or spoiling. An annular rim 88 of the can 80 may be inserted into the second member of the upper portion to intermediate portion securing lock 44 located within the upper portion lid 12. In this case, the second member of an upper portion to intermediate portion securing lock may be a recessed channel 90 (or could be a lip).

Regardless of the form of the intermediate mixed liquid storage receptacle portion, in use, a consumer can remove the intermediate portion 16, 72, 80 from the upper portion lid 12. The user would then break the seal formed by the cover 21 and pour the ingredients stored within compartments 18 and 20 into the bottom portion drinking receptacle 14. The user can then remove the upper portion lid 12 from the intermediate portion 16, 72, 80 to pour the contents, i.e. the mixer, stored within the intermediate portion 16, 72, 80 into the bottom portion drinking receptacle 14.

Figure 6A:
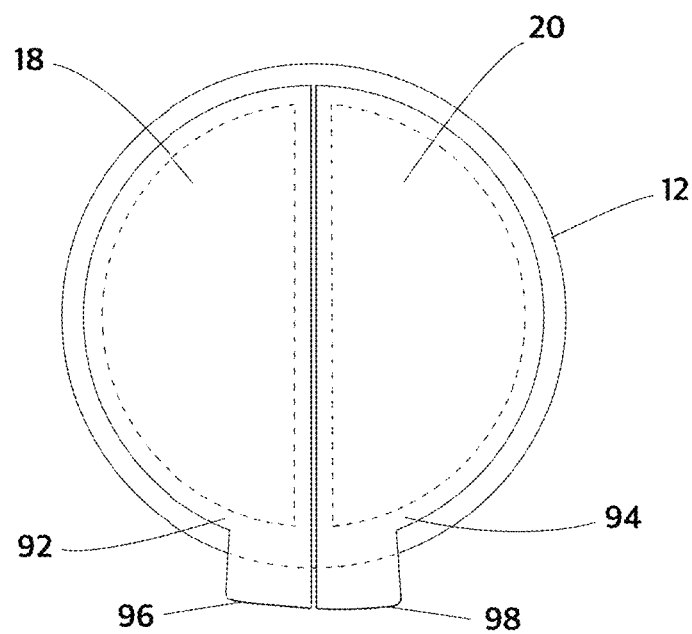
FIG. 6A illustrates the drink container lid with a pull tab sealed cover.
Figure 6B:
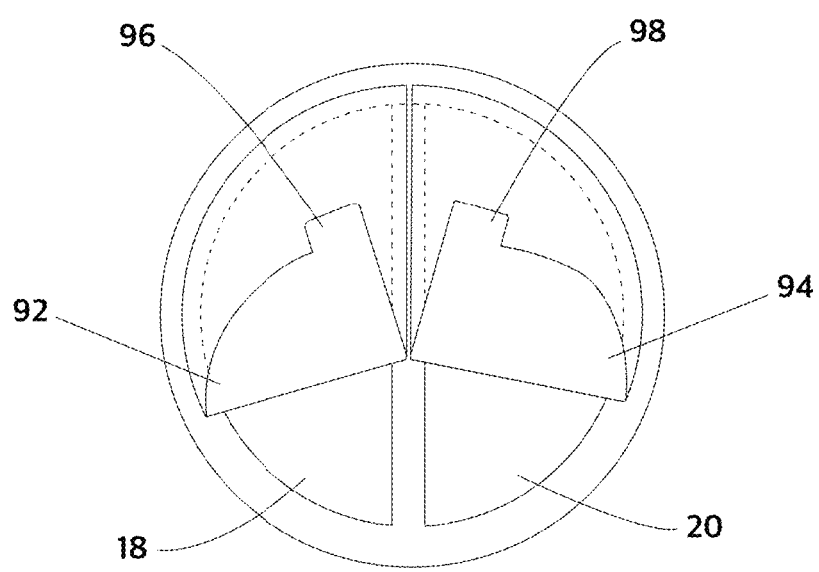
FIG. 6B illustrates the pull tab sealed cover partially peeled from its sealed orientation to expose the contents of the lid based compartments.

FIGS. 6A and 6B illustrate the upper portion lid 12 having independent covers 92 and 94 secured and covering compartments 18 and 20 (see FIG. 6A). Each cover 92 and 94 has a pull tab 96 and 98 which aids a user in peeling back covers 92 and 94, see FIG. 6B. This configuration allows a user to access the contents stored in each compartment 18 or 20 independently. If a user only wants the contents in compartment 18, tab 96 is grasped and pulled back. The contents stored in compartment 20, therefore, will not be poured out as the compartment remains covered by cover 94.

Figure 7:
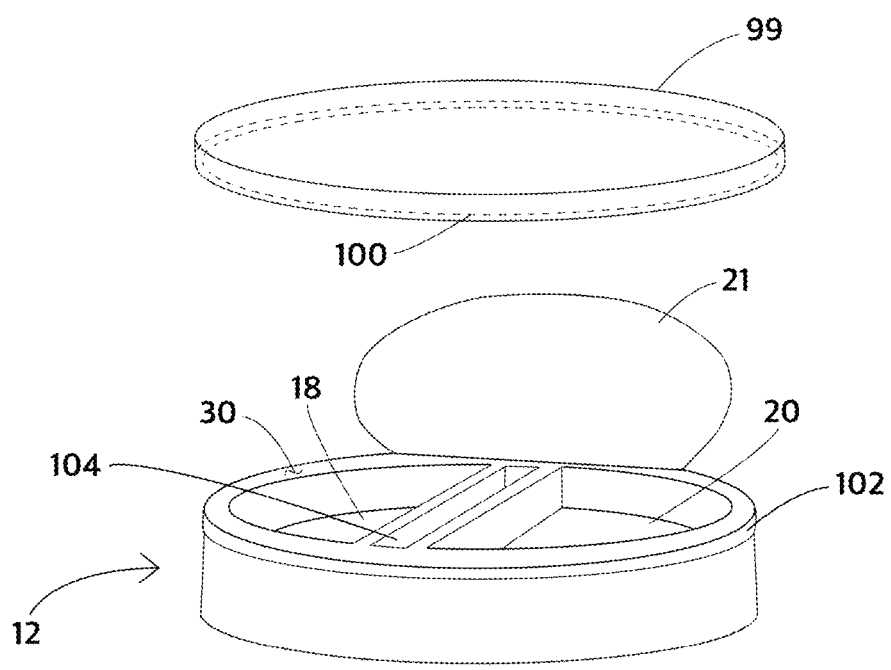
FIG. 7 illustrates the lid portion with a removable soft plastic top cover.

FIG. 7 illustrates the upper portion lid 12 having a soft plastic top lid cover 99. An internal ridge 100 of the top lid cover 99 fits to a lip 102 on the upper portion lid, thereby sealing the lid cover 99 to the upper lid portion 12. The soft plastic top lid cover 99 is configured to secure to a portion of the bottom drinking receptacle portion 14 so as to provide a mechanism that prevents the contents poured into the bottom drinking receptacle portion 14 from spilling out should a user desire to shake or stir the contents stored therein. The top section of the soft plastic top lid cover 99 may be configured to have a larger diameter lower fitted channel. The soft plastic top lid cover 99 can then be the same diameter the bottom drinking receptacle portion 14, allowing it to fit snugly to the bottom drinking receptacle portion 14. The upper portion lid 12 is also shown having a third compartment 104 which can be sized and shaped to hold a straw, a stirrer, or a decorative drink umbrella.

Figure 8:
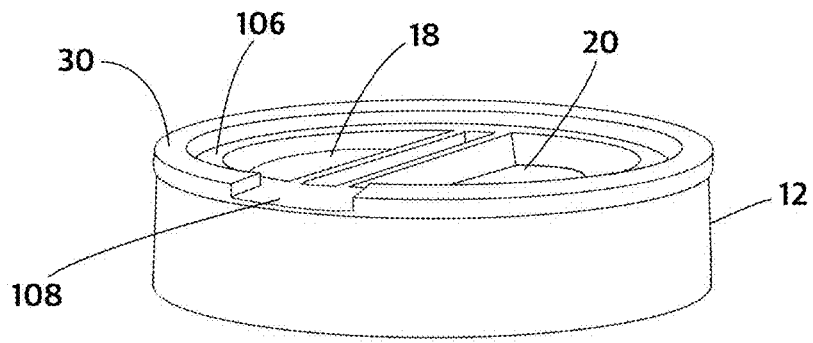
FIG. 8 illustrates the lid portion having a recessed surface.
Figure 9:
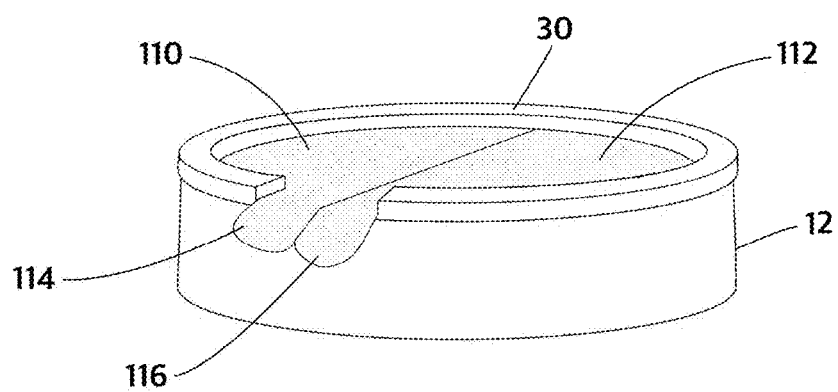
FIG. 9 illustrates the lid portion with pull tab sealed covers.

FIG. 8 illustrates the upper portion lid 12 in which the partially enclosed compartments 18 or 20 are positioned within a recessed surface 106 from the upper surface 30. The recessed surface 106 provides a recessed pour area 108 cut or formed within the upper surface 30. Each partially enclosed compartment 18 or 20 may be enclosed by a covering, such as peel top plastic material (or alternatively, a sealed foil) 110, 112, see FIG. 9. Tabs 114 and 116 provide a user with a mechanism to easily remove the peel top plastic material 110, 112.

Figure 10:
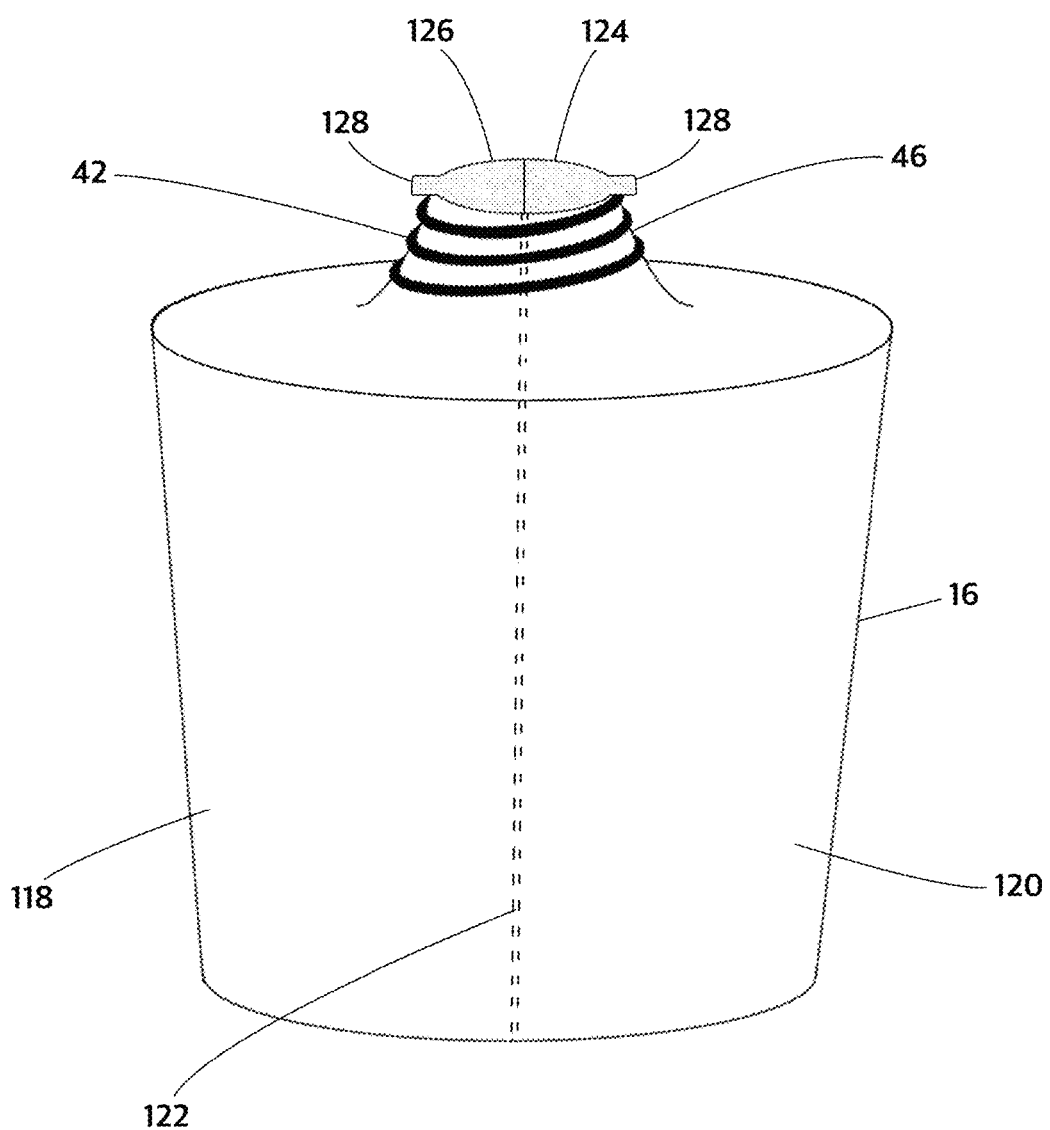
FIG. 10 illustrates the intermediate portion having an internal partition.

FIG. 10 provides an example of the intermediate portion 16 having multiple liquid storage receptacle compartments 118 and 120. The liquid storage receptacle compartment 118 and liquid storage receptacle compartment 120 are separated by an internal partition 122 so that any liquid stored in liquid storage receptacle compartment 118 cannot mix with any liquid stored in liquid storage receptacle compartment 120. The internal partition 122 may extend up through the intermediate portion securing lock body 46. A plurality of plastic covers 124 and 126, with tabs 128, prevent any liquid stored inside from escaping.

Any patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope.

Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A self-contained container for storing fluids having multiple compartments for storing individual components of a mixed drink, which, when mixed together, provide a predetermined, blended liquid concoction, comprising:
    an upper portion comprising at least one partially enclosed compartment formed within a solid surface configured to hold or store one or more first components or ingredients needed for making a mixed drink having a bottom surface positioned at a distance from a top surface of said upper portion, and a wall surrounding said bottom surface, said upper portion comprising a second member of an upper portion to intermediate portion securing lock mechanism configured to interact with and secure to a first member of an upper portion to intermediate portion securing lock mechanism, and a first member of an upper portion to bottom portion locking mechanism configured to interact with and secure to a second member of an upper portion to bottom portion locking mechanism;
    a bottom portion configured to secure to said upper portion via said second member of an upper portion to bottom portion locking mechanism, wherein when said upper portion and said bottom portion are secured together to form a single serve unit in which said upper portion is orientated in a position above said bottom portion; and
    an intermediate portion having a main body being a can or bottle prefilled with a liquid needed for making a mixed drink, said liquid being different than said first components or ingredients needed for making a mixed drink, said intermediate portion comprising said first member of said upper portion to intermediate portion securing lock mechanism configured to interact with and secure to said second member of said upper portion to intermediate portion securing lock mechanism.

2. The self-contained container according to claim 1 wherein said upper portion, said bottom portion, and said intermediate portion, each being secured together to form a single moveable unit.

3. The self-contained container according to claim wherein said upper portion contains at least two partially enclosed compartments sized and shaped to receive and hold said first one or more components or ingredients needed for making a mixed drink.

4. The self-contained container for storing fluids having multiple compartments for storing individual components of a mixed drink, which, when mixed together, provide a predetermined, blended liquid concoction according to claim 3 wherein said first one or more components or ingredients needed for making a mixed drink are liquid.

5. The self-contained container for storing fluids having multiple compartments for storing individual components of a mixed drink, which, when mixed together, provide a predetermined, blended liquid concoction according to claim 4 wherein said first one or more components or ingredients liquid is a non-alcoholic drink.

6. The self-contained container for storing fluids having multiple compartments for storing individual components of a mixed drink, which, when mixed together, provide a predetermined, blended liquid concoction according to claim 4 wherein said first one or more components or ingredients liquid is an alcoholic drink.

7. The self-contained container according to claim 3 wherein said first one or more components or ingredients needed for making a mixed drink are non-liquid.

8. The self-contained container according to claim 3 wherein said compartments for storing individual components of a mixed drink are integrally formed from a body of said upper portion.

9. The self-contained container according to claim 1 wherein said at least one partially enclosed compartment for storing individual components of a mixed drink is enclosed with a cover.

10. The self-contained container according to claim 9 wherein said cover is a plastic material or foil material.

11. The self-contained container according to claim 1 wherein said cover is peelably or removably secured to at least a portion of said upper portion.

12. The self-contained container according to claim 1 wherein said intermediate main body has a smaller diameter than a diameter of said bottom portion.

13. The self-contained container according to claim 1 wherein said upper portion comprises a recessed surface.

14. The self-contained container according to claim 1 wherein said intermediate main body comprises a barrier, said barrier dividing said interior into at least two separate compartments.

15. The self-contained container according to claim 1 wherein said prefilled liquid is a non-alcoholic drink.

16. The self-contained container according to claim 1 wherein said upper portion comprises a recessed pour area cut into or formed within an upper surface.

17. The self-contained container according to claim 1 wherein said prefilled liquid is an alcoholic drink.

* * * * *